C. A. OLSON.
PIPE CUTTING MACHINE.
APPLICATION FILED FEB. 19, 1907.
979,551.
Patented Dec. 27, 1910.
2 SHEETS—SHEET 1.
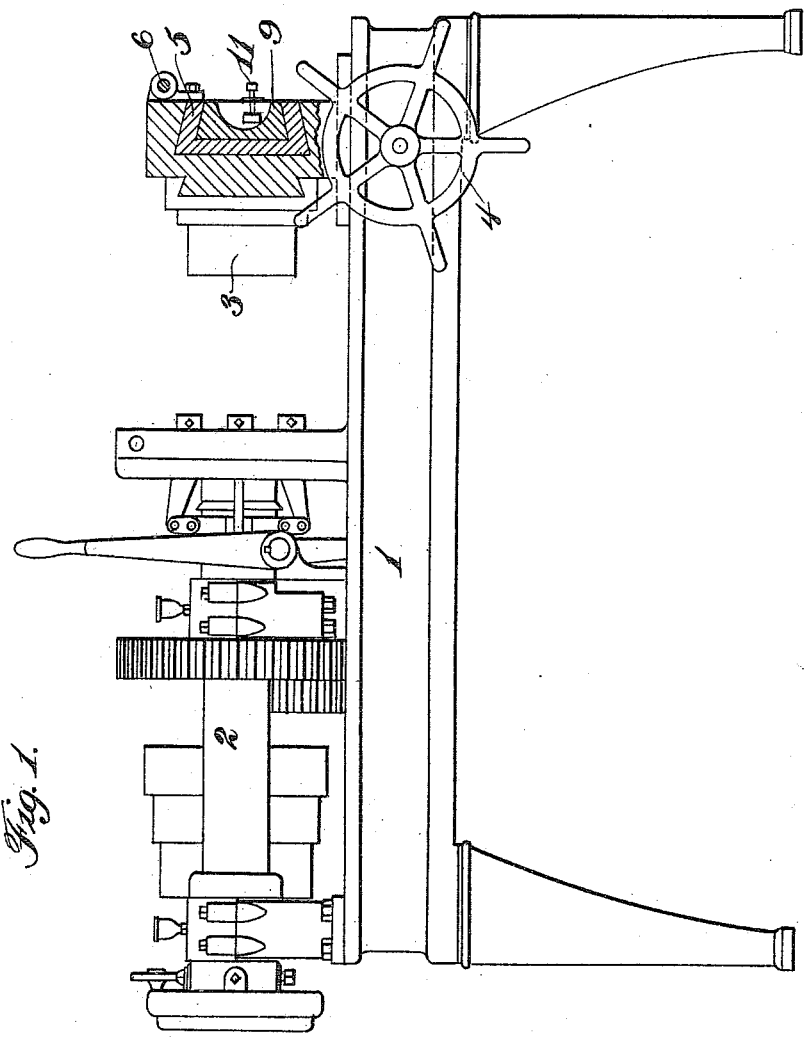

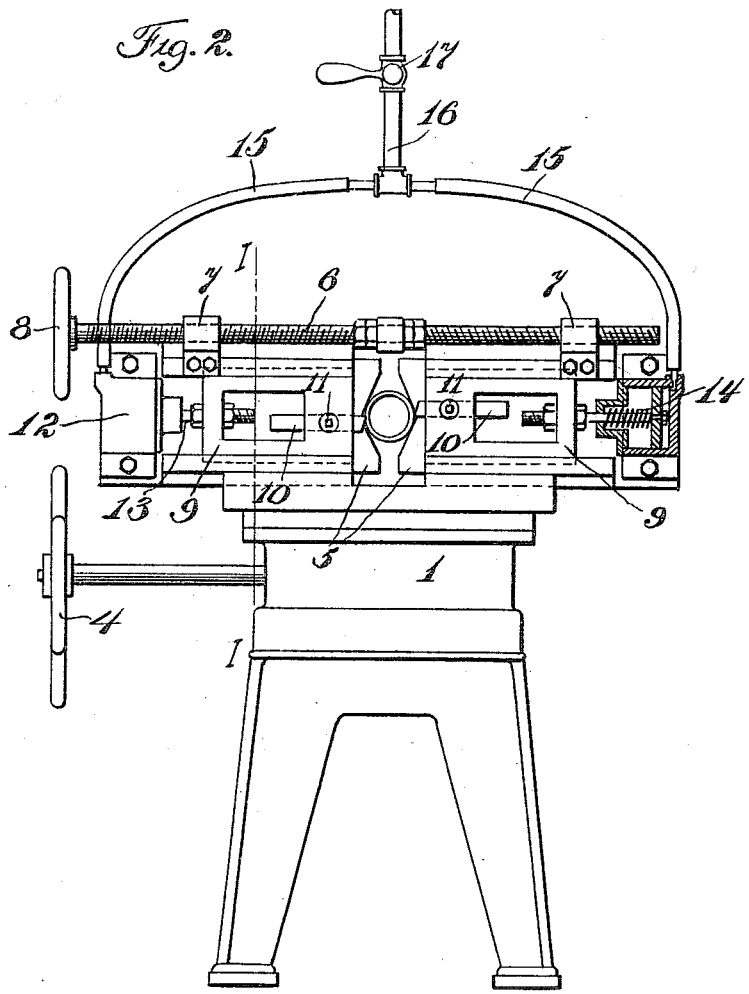

UNITED STATES PATENT OFFICE.

CHARLES A. OLSON, OF CHICAGO, ILLINOIS, ASSIGNOR TO CRANE COMPANY, OF CHICAGO, ILLINOIS, A CORPORATION OF ILLINOIS.

PIPE-CUTTING MACHINE.

979,551.  Specification of Letters Patent.  Patented Dec. 27, 1910.

Application filed February 19, 1907. Serial No. 358,214.

*To all whom it may concern:*

Be it known that I, CHARLES A. OLSON, a citizen of the United States, residing at Chicago, in the county of Cook and the State of Illinois, have invented certain new and useful Improvements in Pipe-Cutting Machines, of which the following is a specification.

My invention relates to a mechanism for cutting off pipe, and has for its objects; to provide an apparatus in which the pipe may be cut off with greater rapidity than has heretofore been done; to provide an apparatus wherein a yielding feed is secured for the cutters thereby permitting them to cut at a speed best suited to the material and to the cutters; to provide an improved arrangement of steady rests and cutters; and to provide an arrangement wherein all of the plurality of cutters may be simultaneously and equally operated. These objects and others which will be apparent to those skilled in the art I accomplish in my invention, one form of which is illustrated in the accompanying drawings, in which Figure 1 is a side view of the machine, the cutting off mechanism being shown in cross section on the line I—I of Figure 2, and Figure 2 is an elevation looking at the right hand end of the device as shown in Figure 1.

My device is intended primarily for the use in cutting off nipples from the end of a long pipe wherein rapidity of operation is desirable, and as usual in machines of this type the pipe is carried in a rotating spindle portion provided with a chuck and means for feeding the pipe forward step by step the length of the nipple into the cutting off mechanism to which this invention particularly relates.

Referring to the drawings, 1 is the body of the machine which may be of any preferred type, 2 is the rotating spindle mechanism by which the pipe is rotated and by which it is fed ahead step by step, which rotating and feeding mechanism is well known in the art and need not be particularly described, 3 is the supporting carrier which is slidably mounted on the frame in the usual way and is movable thereon longitudinally by means of the hand wheel 4 having its shaft operatively connected to the carrier in the usual way, 5 are the steady rest blocks dovetailed into the carrier as indicated in Figure 1, and slidable therein, which blocks engage the pipe as shown in Figure 2, 6 is the adjusting screw for moving the steady rest blocks, which screw passes through brackets 7 attached to the steady rest block and carries the operating hand wheel 8, 9 are the cutter blocks, which blocks as shown in Figure 1 are dovetailed inside of the steady rest blocks 5 and are slidable therein back and forth, 10 are the cutters secured to the cutter block by means of set screws 11, 12 are the cylinders of the pneumatic operating rams, which are secured to the carrier frame 3 and are provided with the pistons 13, which pistons are connected to the cutter blocks in the manner shown in Figure 2, 14 are the springs for returning the pistons to their outer extremes after a nipple has been cut, 15 are pipes leading to the cylinders for supplying air pressure thereto, for moving the cutters inward, 16 is the main supply pipe for the tube pipe 15, and 17 is the valve adapted to control both of the pipes 15 at the same time.

In operation, after a pipe has been fed through the cutters, the valve 17 is opened admitting air through the pipe 15 and forcing the pistons 13 forward till the pipe is severed, after which the valve is turned to the position of exhaust and the springs 14 immediately carry the cutter blocks back to the position shown in Figure 2. This is a very rapid operation as the pressure in the pipe 16 may be adjusted to feed the cutters forward with a speed as high as is consistent with the hardness of the metal cut and the quality of the cutters, and as the springs 14 act on the release of pressure from behind the pistons, no time is lost in withdrawing the cutters, as is the case when screw feeding means are used. Furthermore this arrangement of pneumatic cutters is desirable for the reason that a yielding feed is supplied to such cutters and such feed is adjusted automatically dependent upon the condition of metal cut, which is not the case where a positive feed is employed and the cutters are forced through the hard outside shell of the pipe with the same rapidity as through the inner softer portion. With this arrangement of feeds the cutters last longer and the speed of operation is more rapid than with any positive feed. The arrangement of the steady rest block and the cutter block is also advantageous as the cutter block is inside of the steady block, thereby affording a very compact arrangement and one in which the steady rest block is very close to the cutter.

Having thus described my invention and illustrated its use, what I claim as new and desire to secure by Letters Patent, is the following:

In combination in a pipe cutting machine, a supporting frame, a pair of opposing steady rest blocks slidably mounted therein, means for adjusting and holding such blocks in position, a pair of opposing cutter blocks mounted in the steady rest blocks, cutters mounted therein, and means for moving the cutter blocks inward.

In testimony whereof I have hereunto signed my name in the presence of the two subscribing witnesses.

CHARLES A. OLSON.

Witnesses:
PAUL CARPENTER,
JAMES NICHOLAS LORENZ.